April 13, 1965 G. R. KERENYI 3,178,585

TRANSISTORIZED TRIGGER CIRCUIT

Filed Dec. 23, 1960

INVENTOR.
GABRIEL R. KERENYI
BY Roy C. Hopgood
ATTORNEY

United States Patent Office 3,178,585

Patented Apr. 13, 1965

3,178,585

TRANSISTORIZED TRIGGER CIRCUIT

Gabriel R. Kerenyi, Brooklyn, N.Y., now by change of name Gabriel R. Kern, assignor to Servo Corporation of America, Hicksville, N.Y., a corporation of New York Filed Dec. 23, 1960, Ser. No. 77,995

2 Claims. (Cl. 307—88.5)

This invention relates to a trigger circuit and, more particularly, to a transistorized trigger circuit operable in bistable manner without being affected by noise pulses contained in an applied signal.

Conventional data transmission systems employ bistable transistorized trigger circuits to indicate the level of an applied data signal by switching operation between the states in response to signal voltage inputs at two different levels. Ordinarily, the direct current input signal is perturbed by noise pulses which switch the operating state of the circuit, thereby providing a false indication of the polarity of the data signal.

Attempts to filter the noise pulses so as to obviate this difficulty have not been successful, since the filter elements produce delays in the circuit response which cannot be tolerated. As a result, therefore, conventional trigger circuits are employed and provision is made in them for maximizing the ratio of the two voltage inputs so as to tolerate the noise pulses without the concomitant switching of the circuit.

The maximum ratio attainable utilizing conventional trigger circuits having germanium transistors is limited to five. Circuit operation at voltage input levels having a ratio greater than this value requires a sacrifice in the temperature stability of the circuit. Since the maximum peak noise in a data signal often causes operation at voltage levels exceeding this ratio limit, conventional trigger circuits are not satisfactory for use in data transmission systems.

Accordingly, it is an object of the invention to provide a transistorized trigger circuit, operable in bistable manner at different voltage levels of an applied data signal, which is not affected by the noise pulses accompanying the data signal.

It is another object of the invention to provide a bistable transistorized trigger circuit having a substantially higher ratio of voltage input levels than that previously attainable.

Briefly stated, there is provided a trigger circuit operable in bistable manner at different voltage levels of an applied data signal producing distinct voltage outputs indicative of the level of the data signal. Two transistors are provided for operation in the respective states of the circuit and these transistors are coupled together by an arrangement for establishing the ratio of the operating voltage levels. This arrangement includes a third transistor and a voltage divider network.

Figure 1:
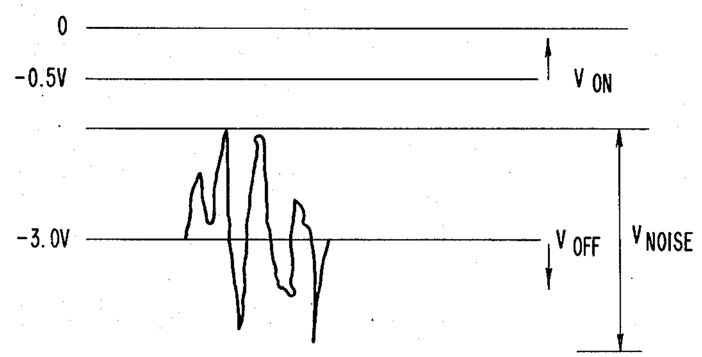
Figure 2:
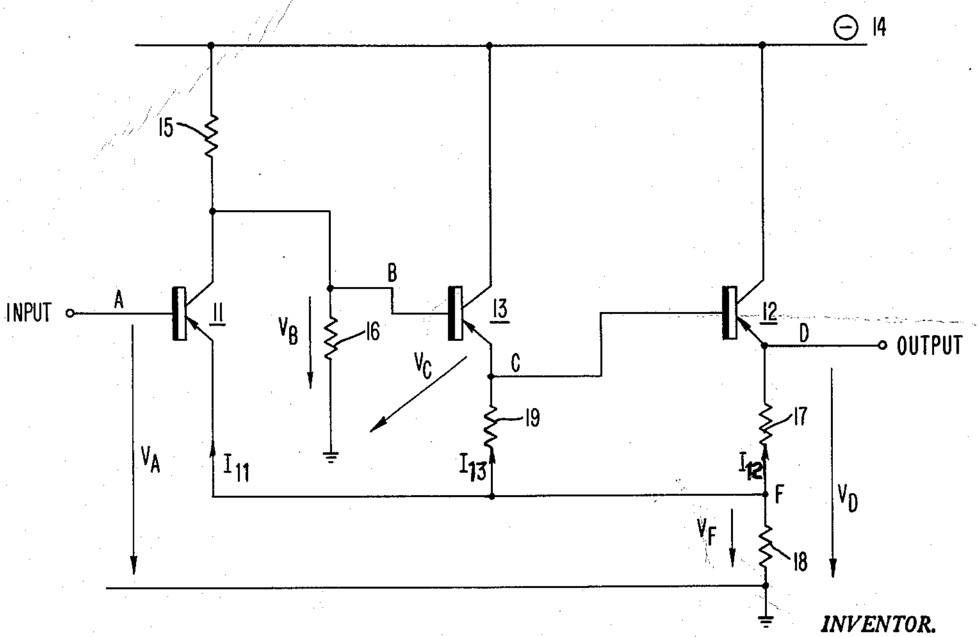

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a diagram illustrating the boundary voltage input levels necessary to produce the two stable states; and, FIG. 2 is a schematic diagram of the trigger circuit of the invention.

Referring now to FIG. 1, V on and V off are the boundary voltage input levels required to produce the stable operating states of a trigger circuit. The ratio of the input voltage levels of an applied signal should be high so as to permit toleration of the noise pulses in the signal. For example, one state may operate for an input of −0.5 v. or lower and the other state for an input of −3.0 v. or higher.

If the maximum peak noise is a fixed value which is not subject to control, and V on is also fixed then the ratio $$\frac{V\text{ on}}{V\text{ off}}$$

must be such that:

$$|V\text{ noise}|<|V\text{ on}|-|V\text{ off}|$$

The trigger circuit of the invention accomplishes this by substantially increasing this ratio, so that noise pulses do not switch the operating state to the V on state.

Referring now to FIG. 2, the novel trigger comprises an input circuit including a transistor 11 and an output circuit including a transistor 12. The input and output circuits are coupled together by an arrangement including a third transistor 13. Each transistor 11–13 may be of the conventional type having base, emitter and collector electrodes. As illustrated, the transistors are of the PNP type which conduct when the collector electrode is more negative than the base electrode and the base electrode is more negative than the emitter electrode. Obviously, NPN transistors may also be employed with the usual changes in biasing circuitry.

In the initial operating condition, the input voltage to the trigger circuit is zero, i.e., $V_A=0$, and the transistor 11 is in a non-conducting condition. Simultaneously, the transistors 12–13 are rendered conducting by the biasing voltage supplied to their respective collector electrodes and to the base of transistor 13, from a negative source of potential 14. A negative output voltage $V_D$ is produced, corresponding to the first stable operating condition of the circuit.

Both transistors 12–13 are connected as emitter followers, and the base electrode of transistor 13 is biased by the voltage developed across a voltage divider 15–16 connected between the negative supply 14 and ground. When thus connected, a voltage is developed across a voltage divider 17–18 connected between the emitter electrode of transistor 12 and ground. The voltage across resistor 18 appears across the base to emitter junction of transistor 11, and the voltages across resistors 18 and 19 constitute the bias across the base to emitter junction of transistor 13.

The value of the resistor 19 is chosen to be approximately five times greater than the total resistive value of the voltage divider 17–18, and the value of the resistor 16 is selected to be approximately five times greater than the resistor 19, i.e., $$R_{19}=5(R_{17}+R_{18})$$

and $$R_{16}=5R_{19}$$

where R is the resistance of the resistor indicated by the subscript. By selecting these relative values of resistance, reasonable temperature stability of the circuit is obtained.

During the first stable operating condition, the voltages between the points B, C and D and ground are:

$$V_B\simeq V_C\simeq V_D\simeq\frac{-R_{16}E}{R_{15}+R_{16}}$$

and the voltage from point F to ground is:

$$V_F=-(I_{13}+I_{12})R_{18}=\frac{-R_{16}R_{18}E}{R_{15}+R_{16}}\left[\frac{1}{R_{17}+R_{19}}+\frac{1}{R_{17}+R_{18}}\right]$$

where —E is the voltage of the power supply 14.

In like manner, $I_{11}$, $I_{12}$, $I_{13}$, the emitter currents of the transistors 11, 12 and 13, respectively, are:

$$I_{11}=0$$

$$I_{13}=\frac{R_{16}E}{(R_{15}+R_{16})(R_{19}+R_{18})}$$

$$I_{12}=\frac{R_{16}E}{(R_{15}+R_{16})(R_{17}+R_{18})}$$

The value of $V_F$ determines the value of the input voltage $V_A$ that causes the transistor 11 to conduct. If this value of $V_A$ is V on, then $$V\text{ on}=\frac{-R_{16}R_{18}E}{R_{15}+R_{16}}\left[\frac{1}{R_{17}+R_{19}}+\frac{1}{R_{17}+R_{18}}\right] \quad (1)$$

As a voltage is coupled to the base electrode of transistor 11, causing it to conduct, the voltages at the points B, C, and D become less negative. The currents $I_{12}$ and $I_{13}$ also become smaller causing the voltage at point F to move in the positive direction. The bias voltage developed across voltage divider 17–18 decreases forcing the transistor 11 to saturation and renders the transistors 12–13 non-conductive. This condition is the second stable operating condition of the trigger circuit.

During the second stable condition of operation, $$I_{12}=I_{13}=0$$

$$I_{11}=\frac{E}{R_{15}+R_{18}}$$

and the output voltage is equal to the voltage between the point F and ground, i.e., $$V_D=V_F=\frac{-ER_{18}}{R_{15}+R_{18}}$$

As long as the input voltage $V_A$ is less than this value, the transistor 11 continues to conduct. However, as the input voltage moves in the positive direction, the transistor 11 ceases to be in a saturated condition, when $$V_A=\frac{-ER_{18}}{R_{15}+R_{18}}=V\text{ off} \quad (2)$$

At the same time, the transistors 12 and 13 begin to conduct, increasing the emitter currents $I_{12}$ and $I_{13}$. The point F becomes more negative decreasing the current $I_{11}$ and biasing the emitter to base junction of transistor 11 until it is rendered non-conducting. When this occurs the trigger circuit returns to the initial or first stable state of operation.

To evaluate the ratio of the two voltage input levels $$\frac{V\text{ on}}{V\text{ off}}$$

corresponding to the two stable states of circuit operation, the Equation 1 should be divided by the Equation 2:

$$\frac{V\text{ on}}{V\text{ off}}=\frac{R_{16}(R_{15}+R_{18})}{R_{15}+R_{16}}\left[\frac{1}{R_{19}+R_{17}}+\frac{1}{R_{17}+R_{18}}\right] \quad (3)$$

If it is assumed that:

$$R_{15}+R_{18}\cong R_{15}$$

$$R_{19}+R_{17}\cong R_{19}$$

and if these values, along with the initial assumptions for $R_{16}$ and $R_{19}$ are substituted in Equation 3, then the ratio $$\frac{V\text{ on}}{V\text{ off}}=\frac{5R_{19}R_{15}}{R_{15}+5R_{19}}\left[\frac{1}{R_{19}}+\frac{5}{R_{19}}\right]=\frac{30R_{15}}{R_{15}+5R_{19}}=\frac{30R_{15}}{R_{15}+R_{16}} \quad (4)$$

As the value of the resistor 15 is made to increase, the ratio of Equation 4 approaches the value thirty, i.e., $$\lim_{R_{15}\to\infty}\frac{V\text{ on}}{V\text{ off}}=30$$

On the other hand, if $R_{15}=R_{16}$ $$\frac{V\text{ on}}{V\text{ off}}=\frac{30R_{15}}{R_{15}+R_{15}}=15$$

As previously stated, the maximum ratio of voltage input levels, that can be attained utilizing a conventional transistorized trigger circuit, is limited to five without sacrificing the temperature stability of the circuit. It is obvious that this ratio may be substantially increased by the arrangement of the invention. It is accomplished without decreasing the circuit temperature stability and, in fact, operation at a ratio of voltage input levels of fifteen, in the inventive arrangement, provides the same temperature stability as a conventional circuit when operating at a ratio of 2.5.

Moreover, the circuit of the invention tolerates the maximum peak noise pulses in a data signal without switching the circuit, thereby providing a true indication at the circuit output of the polarity of the applied signal.

While the foregoing description sets forth the principles of the invention in connection with specific circuits, it is to be understood that this description is made only by way of example and not as a limitation of the scope of the invention as set forth in the objects thereof and in the accompanying claims.

What is claimed is:

1. A trigger circuit having first and second stable operating states for producing first and second voltage outputs indicative of the polarity of an applied data signal, comprising a pair of conductors, an input circuit including a first transistor having emitter, base and collector electrodes, said first transistor having its emitter-collector path coupled between said conductors through a portion of a first voltage divider and a portion of a second voltage divider, said first transistor being operative in said said first state in response to a voltage input at a first level for producing said first voltage output, an output circuit including a second transistor having emitter, base and collector electrodes, said second transistor having its emitter-collector path coupled between said conductors through said second voltage divider and being operative in said second state in response to a voltage input at a second level for producing said second voltage output, and means coupling said input and output circuits for establishing the ratio of said first and second voltage levels, said means being characterized by said first voltage divider and a third transistor having emitter, base and collector electrodes, said third transistor having its emitter-collector path coupled between said conductors through said portion of said second voltage divider and another resistor connected in series therewith, said first voltage divider being connected across said conductors, said third transistor further having its base electrode coupled to a point on said first voltage divider intermediate its ends, said emitter electrode of said third transistor being coupled to the base of said second transistor, said collector electrode of said first transistor also being coupled to a point on said first voltage divider intermediate its ends.

2. The trigger circuit of claim 1, wherein the emitter electrode of said second transistor is ground connected through first and second resistors comprising said second voltage divider, the emitter electrode of said third transistor is coupled to said second voltage divider through said another resistor, and said first voltage divider coupled to the collector electrode of said first transistor includes third and fourth resistors of substantially equal value, said another resistor being greater than but not exceeding five times the total value of said first and second resistors, and said third resistor being greater than but not exceeding the value of said another resistor, whereby the ratio of said first and second voltage input levels is fifteen.

References Cited in the file of this patent

UNITED STATES PATENTS

| | | |
|---|---|---|
| 2,640,153 | McCurdy | May 26, 1953 |
| 2,837,663 | Walz | June 3, 1958 |
| 2,976,427 | Armanini | Mar. 21, 1961 |
| 3,068,368 | Grunwaldt | Dec. 11, 1962 |
| 3,106,650 | Bordelon | Oct. 8, 1963 |

OTHER REFERENCES

"Complementary Pulse Generator," by Droege et al., IBM Technical Disclosure Bulletin, vol. 1, No. 2, August 1958, page 27.